United States Patent [19]

Souza

[11] 4,175,351

[45] Nov. 27, 1979

[54] PADDED JAW ANIMAL TRAP

[75] Inventor: Anthony J. Souza, Lancaster, Pa.

[73] Assignee: Woodstream Corporation, Lititz, Pa.

[21] Appl. No.: 862,029

[22] Filed: Dec. 19, 1977

[51] Int. Cl.² ............................................. A01M 23/26
[52] U.S. Cl. .......................................................... 43/90
[58] Field of Search ............................................ 43/90

[56] References Cited
U.S. PATENT DOCUMENTS 2,146,464   2/1939   Briddell .................................... 43/90

Primary Examiner—Robert Louis Spruill
Assistant Examiner—J. T. Zatarga
Attorney, Agent, or Firm—Holman & Stern

[57] ABSTRACT

Disclosed is a padded jaw animal trap with a shock absorber means built into the padding on each jaw in order to reduce the peak loads encountered when the jaw closes on an animal's leg. A cavity is provided between the padding face and the jaw of the animal trap such that the cavity separates the animal's leg from the steel jaw. The cavity may be filled with a gas, liquid or foamed elastomer in order to perform its function of reducing the initial shock loads when the trap closes about an animal. Preferred embodiments include an apparatus to retain the padding on the jaw of an animal trap along with a U-shaped jaw construction which facilitates mounting of padding material on an animal trap jaw.

27 Claims, 13 Drawing Figures

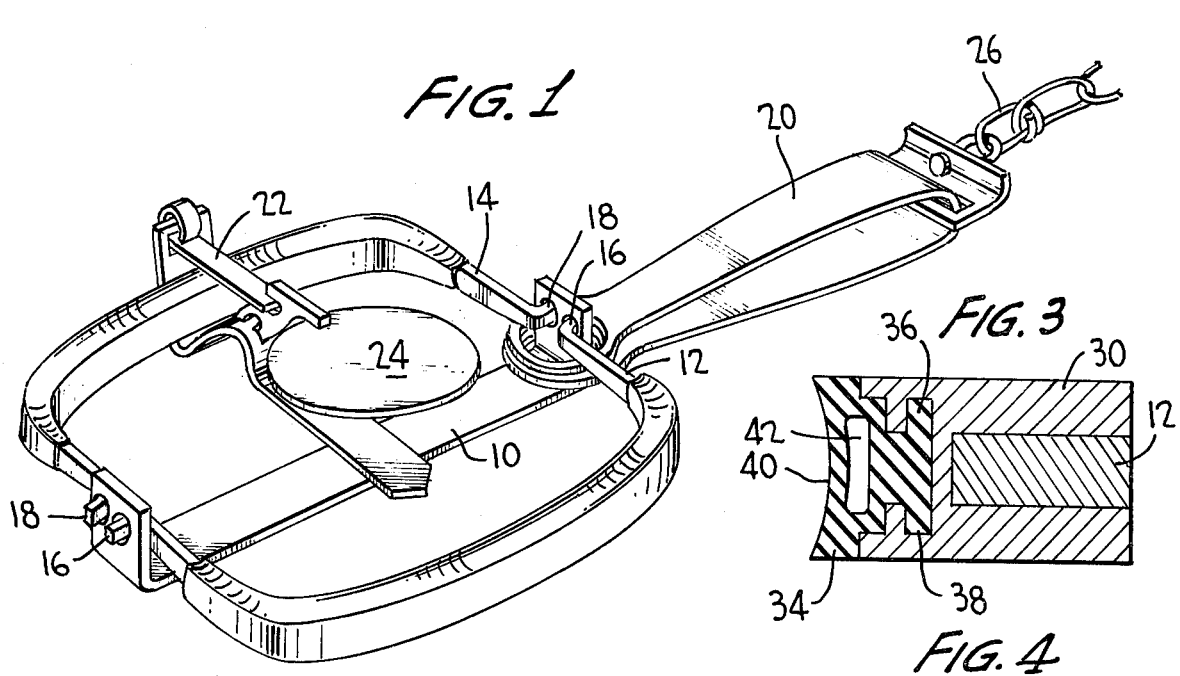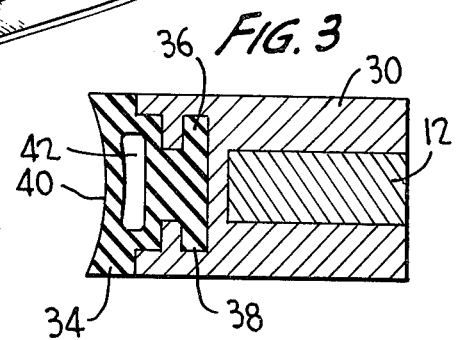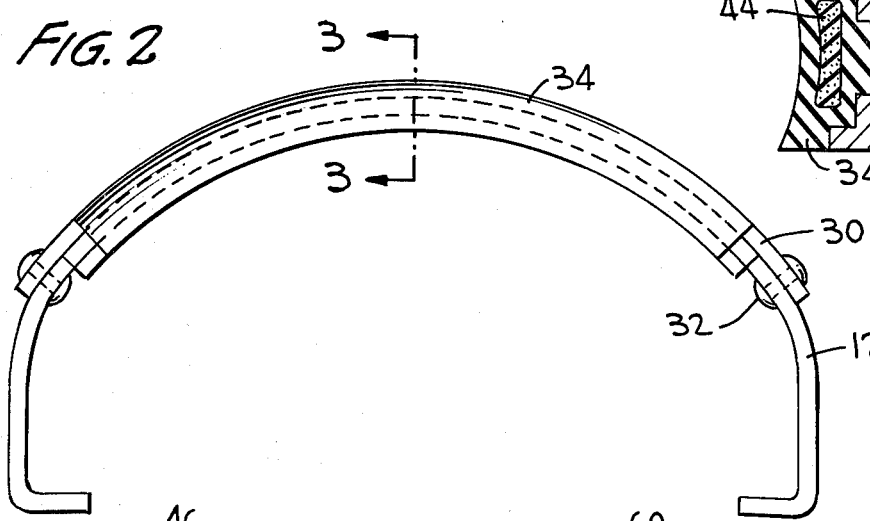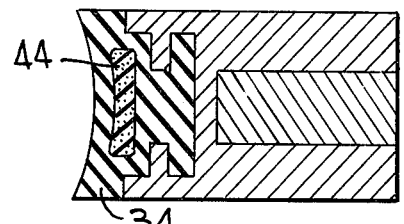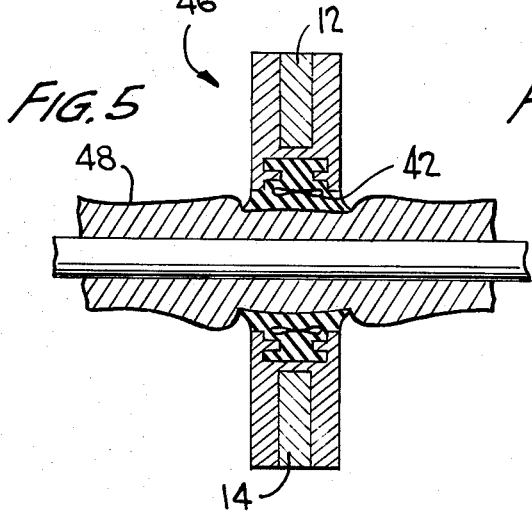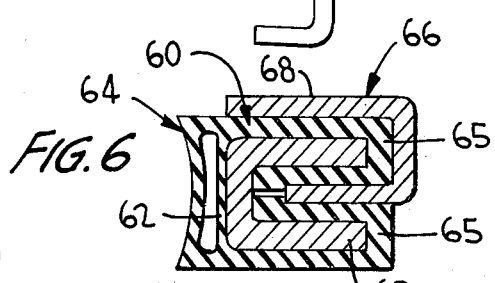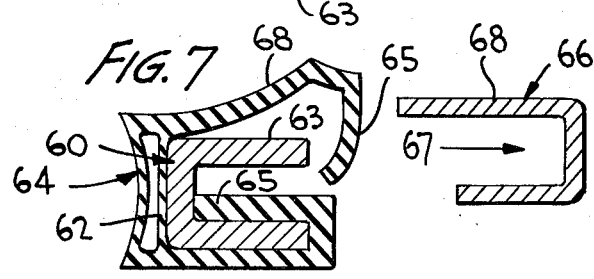

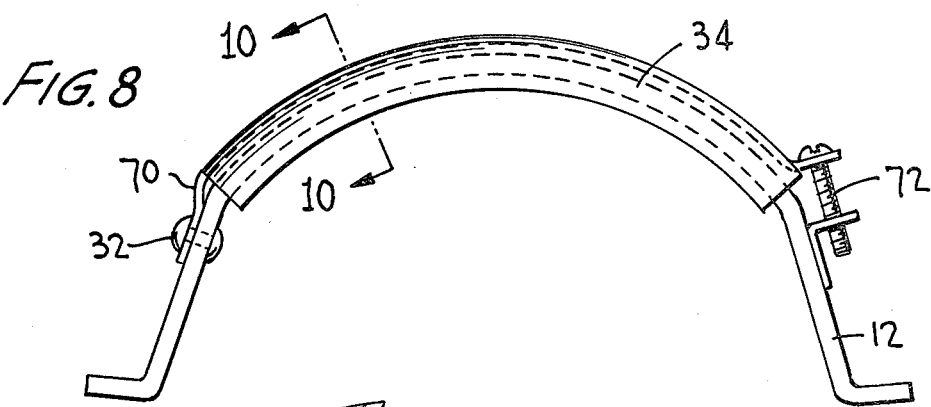
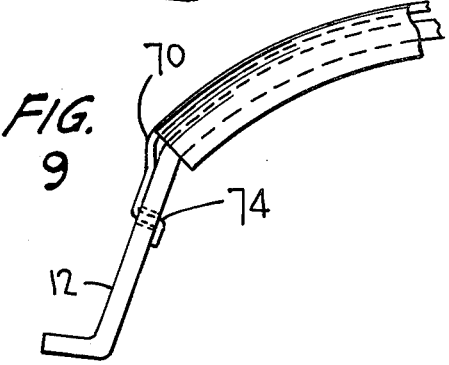
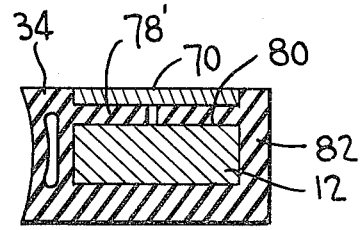
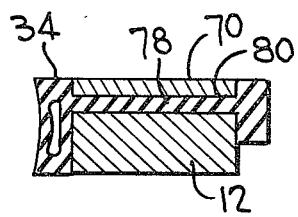
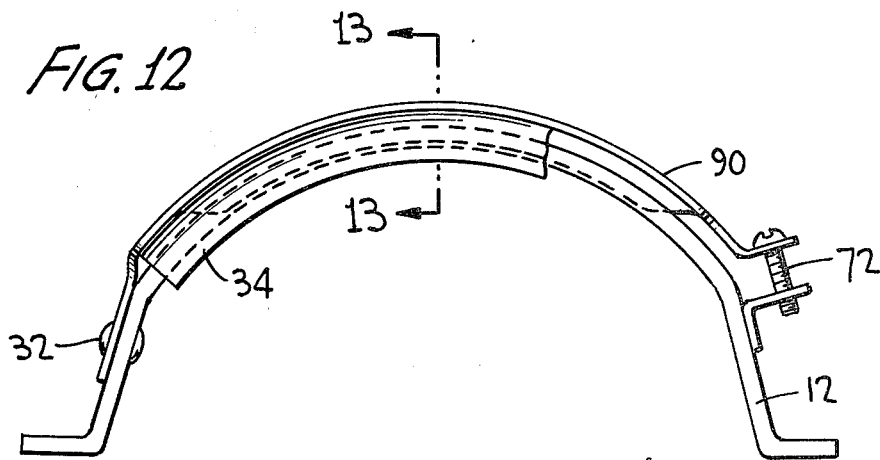
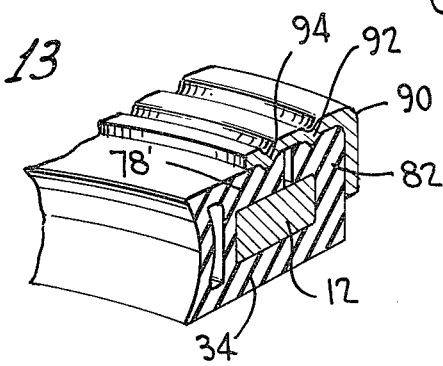

PADDED JAW ANIMAL TRAP

BACKGROUND OF THE INVENTION

The present invention relates to padded jaw animal traps generally, and relates more particularly to improvements in the padding material capable of minimizing initial shock load on closing without significant reduction in ultimate holding power of the trap.

Animal traps have been in use for many years in the animal control and fur trapping industry, and are widespread in their application. Generally, a pair of jaws are biased from a set position towards a sprung position by an actuator device, which can be a spring or other means. The jaws are generally retained in a set position by a latch and trigger mechanism, wherein the animal initiates operation of the trap by actuating the trigger mechanism. Once triggered, the jaws clamp shut, retaining an extremity of the animal therebetween.

The padding of animal trap jaws, indeed, is well known, as can be seen in the following patents:

| Country | Pat. No. | Patentee |
| --- | --- | --- |
| United States | 870,251 | Rasmussen |
| United States | 1,461,743 | Accola |
| United States | 1,825,193 | Maddox |
| United States | 2,128,579 | Corey |
| United States | 2,146,464 | Briddell |
| United States | 2,316,970 | O'Neil |
| United States | 3,939,596 | Webley |
| England | 18,632 | Mitchell |

The purpose of the padding material is to reduce the peak loads applied to the animal's extremity due to the inertial forces of the jaws' closing. Generally, the actuating springs are sized so as to provide the necessary retention force between the jaws to prevent the animal from withdrawing his extremity from the trap. With the advent of padded jaws, it became somewhat easier for an animal to withdraw a paw by causing the padding material to roll about the longitudinal axis of the jaw itself. The flexible nature of the material utilized in the pad, and the thickness of the pad, contribute to this roll-out disadvantage which is attributable to the prior art padded jaws.

To compensate for this disadvantage, stronger actuator springs could be utilized to maintain the holding power of the animal trap. Unfortunately, when the actuating spring strength is increased, the inertial impact of the jaw on the animal's leg is also increased thereby defeating the purpose of the padding. To increase the retaining capabilities without requiring a stronger actuator, a special design of the padding face has been developed, as disclosed in commonly assigned co-pending U.S. Application Ser. No. 858,905, filed Dec. 8, 1977, the subject matter of which is incorporated herein in its entirety by reference. It is still desired, however, to reduce the shock of the initial impact of the closing jaws on an animal's paw without significantly diminishing the ultimate retention power.

Additionally, problems exist in securing a padding material to a steel trap jaw in a manner which is reliable, and preferably, capable of ready replacement as the padding material becomes worn or damaged in use.

SUMMARY OF THE INVENTION

It is, therefore, a primary object of the present invention to provide a shock absorber means in the padding of an animal trap jaw to reduce the peak inertial loads upon jaw closure without significant loss of retention capabilities.

A further object of the present invention is to include a cavity filled with material of lower compressive resistance than the padding material itself between the face of the padding and the face of the steel jaw to thereby absorb initial shock on closure of the jaws, and minimize discomfort to the animal.

A still further object of the present invention is to provide a shock absorber means in combination with a concavely-curved padding face, permitting lower spring pressures with increased holding ability.

Yet another object of the present invention is to provide a padding arrangement which may be easily fitted to existing unpadded animal traps.

A still further object of the present invention is to provide a means of releasably retaining a padding material on the jaw of an animal trap in a highly secure manner, while permitting ready replacement for maintenance.

The above, and other objects, are achieved by providing a chamber between the padding face and the animal trap jaw, such that during closure about an animal's leg, the inertial forces of the jaws' closing will be taken up in compressing the material within the chamber in the vicinity of the animal's leg. In various preferred embodiments, the chamber may be filled with a gas, a liquid, or a foamed elastomer in any combination which provides a shock absorbing capability. Additionally, preferred embodiments of the present invention incorporate a concavely-curved jaw face which, particularly in combination with the shock absorber concept, maximizes animal retention while minimizing trauma to the animal. Particularly, preferred embodiments incorporate simple, and yet efficient, constructions for attaching a padding material to a steel jaw, preferably in a readily removable fashion.

BRIEF DESCRIPTION OF THE DRAWINGS

The invention will be better understood, and objects other than those set forth above, will become apparent when considered in view of the drawings, wherein:

FIG. 1 is a perspective view of one form of a conventional leg hold trap incorporating a padding material according to one embodiment of the present invention;

FIG. 2 is a side elevational view of a single jaw illustrating one form of pad mounting means;

FIG. 3 is a cross-sectional view along section lines 3—3 of the padded jaw in FIG. 2;

FIG. 4 is a cross-sectional view of a different embodiment of the padded jaw illustrated in FIG. 3;

FIG. 5 is a partial cross-sectional view of a padded jaw of the type shown in FIG. 3 engaging the limb of an animal;

FIG. 6 is a cross-sectional view of a modified form of padded jaw retaining means according to the instant inventive concept;

FIG. 7 is an exploded view of the embodiment of FIG. 6, showing the manner in which the locking channel is disengaged to remove and replace the padding means;

FIG. 8 is a side elevational view illustrating a different method of retaining the padding material on an animal trap jaw;

FIG. 9 is a partial view of yet another embodiment of a padding retention means according to this invention;

FIG. 10 is a cross-sectional view of the jaw in FIG. 8 along section lines 10—10;

FIG. 11 is a cross-sectional view of a still further embodiment of padding retention means according to the instant inventive concept;

FIG. 12 is a side elevational view of a further embodiment of a padding retention means; and FIG. 13 is a perspective cross-sectional view along section lines 13—13 of the padded jaw retention means shown in FIG. 12.

DETAILED DESCRIPTION OF THE PREFERRED EMBODIMENTS

Referring now to the drawings, wherein like reference characters designate like parts throughout the several views, FIG. 1 illustrates the application of a padding material to a conventional leg-hold animal trap. The trap is primarily comprised of a base portion 10, with pivoting jaw means mounted thereon, in the preferred embodiment jaws 12 and 14. The jaws rotate about pivot points 16 and 18, which define a pivot axis for each jaw, respectively, under the urging of an actuator means, for example, spring 20. Although a single long spring has been shown, clearly one or more coil springs and the like could be utilized in lieu thereof.

A latch means mechanism 22 holds the jaws in a set position, as illustrated in FIG. 1. When an animal presses the trigger means, in the embodiment shown, bait pedal plate 24, the latch means is released, permitting spring 20 to force jaws 12 and 14 into a closed, or sprung position. When the jaws have closed on an animal's extremity, chain 26, which may be anchored to a relatively solid object, prevents the trap's movement. While chain 26 is shown attached to the end of spring 20, it could also be attached to the center of base portion 10, or elsewhere, in order to anchor the trap against undesirable movement.

A side view of one embodiment of a padded jaw is shown in FIG. 2 in which jaw 12 has an additional jaw portion 30 connected thereto by rivets, or the like, 32. Clearly, the jaw 12 could be integrally formed, such that the additional jaw portion 30 would be unnecessary, but in order to facilitate modifying available traps, the additional jaw portion 30, in the form of an extrusion which may be secured in any conventional manner to a pre-existing trap, is shown.

In this embodiment, the padding means 34 is provided with protrusions 36 which slidably cooperate with the undercut channel 38 in the jaw portion 30, in a press-fit manner, to firmly maintain the position of padding means 34 on the jaw 12, while permitting removal of the padding means for replacement.

Although the padding retention means shown in FIGS. 2 and 3 is generally applicable, these figures show one embodiment of an important feature of the instant inventive concepts, namely the incorporating in the padding means 34 of an absorber means between the face of the steel jaw 12 and the face 40 of the padding means 34. The absorber means as shown comprises a longitudinally extending closed cavity or chamber 42, which may be filled with a gas such as air, either at ambient or increased pressures, a liquid such as water, oil, or the like, or an elastomeric foam material 44, as shown in FIG. 4, of lower compressive resistance than the material of the padding means 34, such as polyurethane foam.

The operation of the absorber means, according to the present invention, is much like the airbag-type shock absorber in automobiles, in that it causes impact loads to be distributed over a wider surface area, as well as over an actuating distance. By actuating distance, it is meant that as jaw 12 moves in the direction of arrow 46 (note FIG. 5), and contacts the animal's limb 48, the chamber 42 will be compressed, thus absorbing a portion of the kinetic energy of jaw 12. Thus, the chamber, like the "airbag" in an automobile, absorbs a large portion of the impact energies which exist during jaw closure.

Although the foam-filled chamber 44 would operate in a similar manner, embodiments which incorporate an incompressible fluid such as a liquid operate in a slightly different manner, particularly if the chamber is completely filled with the fluid. Because the animal's limb 48 would cause a compression of the chamber 42 at only one portion of its longitudinal length (as it extends from one rivet to the other, as shown in FIG. 2), the localized compression of chamber 42 would tend to force the liquid to move into portions of the chamber which are not in contact with the animal's limb 48. Obviously, energy is expended in causing the liquid to move with the result that the impact energies of the jaw are absorbed. Even if the liquid is incompressible, the chamber elsewhere (because of the resilient nature of the padding 34) will expand to accomodate the shifting volume of liquid. Thus, even a chamber filled with an incompressible liquid can properly function as a shock absorber, as long as the padding face material is sufficiently resilient to permit chamber expansion elsewhere to absorb the displaced liquid. Varying combinations of liquids can be utilized to provide the appropriate flow characteristics, such that the impact energies are substantially completely dispersed when the jaw contacts the animal's limb.

Although the impact energies are substantially minimized on initial contact of the padded jaw faces with an animal's limb because of the shock absorber means (which is preferably incorporated in the padding material), thereby minimizing discomfort to the animal at a time when it would be maximum in prior art constructions, the continued pressure of the actuating means, or springs, quickly collapses the chamber completely, or substantially completely, at the point of engagement with the animal's limb to establish the maximum holding and retention power almost immediately after engagement. This retention capability may be significantly improved, and the tendency for the padding material to roll may be significantly reduced, by utilizing, in combination with the absorber means, a padding configuration adapted to quickly raise a ridge of flesh adjacent the longitudinal edges of the padding material, as shown particularly in FIG. 5, and as described in detail in the aforementioned co-pending application.

Although one method of removably securing a padding material to a trap has been shown in FIG. 2 and described above, other desirable constructions can also be utilized. For example, FIGS. 6 and 7 disclose another preferred embodiment in which each jaw means is defined by a U-shaped jaw member 60 with a jaw face 62 and jaw sides 63 extending away from the jaw face towards the open portion of the jaw member 60. The padding material 64, for use with this embodiment, is formed with portions 65 extending along the jaw sides and into the open portion of the jaw member 60. A U-shaped locking channel 66 is placed, such that one side is inserted between opposite extended portions 65 of the padding means, and forces the padding into a tight frictional engagement with the inner sides of the jaw member 60. Removal and disassembly of the locking channel 66 from the jaw member is shown in FIG. 7. The locking channel 66 is preferably pivotally supported (not shown) adjacent one end of the jaw member 60 for movement in the direction of the arrow 67 (FIG. 7) with any suitable retaining means being provided on the other end to permit the locking channel to be held in place until it is desired to replace the padding material 64.

Another feature of the embodiment of FIGS. 6 and 7 is that the portion 68 of the locking channel 66, which extends externally over the upper extended portion of the padding means 64, provides a certain protection to the padding, preventing the animal from gnawing through the padding to facilitate escape.

A further method of retaining the padding material on a steel jaw is shown in FIGS. 8 and 10, wherein a retention means is provided, such as a spring metal strap 70, or the like, affixed to jaw 12 at one end by a rivet 32, or the like, and at the other end by an adjustable pressure means, such as screw 72, or the like, placing the metal strap under tension. As can be seen in FIG. 10, the tension applied to strap 70 over the arc described by the jaw 12, creates a compression, squeezing the padding means between the strap and the jaw.

An alternate means of attaching metal strap 70 to the jaw 12 is shown in FIG. 9, in which a portion of the strap is inserted through an aperture in the jaw, which permits complete removal of strap 70 if so desired.

In FIG. 11, the padding means 34 has a portion 78 which extends along jaw side 80. The retention means, in this embodiment metal strap 70, compresses portion 78 between jaw 12 and the strap, fixing the padding means on the jaw means. In the embodiment of FIG. 10, the portion 78' extends partially along jaw side 80, with a partially encompassing portion 82 of the padding means 34 extending around jaw 12. Again, the retention means, metal strap 70, places portions of both portion 78' and encompassing portion 82 under compression, securely retaining the padding means on the jaw means.

Clearly, in view of FIGS. 8–11, any number of modifications to this mounting system will be obvious to one of ordinary skill in the art. For example, metal strap 70 could be located underneath jaw 12 instead of on top, as depicted in FIGS. 8 and 9. Obviously, then, to maintain compression between the strap and the jaw, a pressure means, for example the screw 72 shown in FIG. 8, would apply compression to the strap, rather than tension as shown in FIG. 8, forcing the strap up towards the jaw.

A modification of the metal strap 70 of FIG. 10 is shown in FIGS. 12 and 13, wherein the retention means 90 has two high points 92 and 94, which extend longitudinally along with the jaw 12. These high points 92 and 94, when the retention means is under tension (by means of screw 72), are forced into portion 78' and encompassing portion 82 of the padding means 34, increasing the compression of the padding material between the high points and the jaw 12. This, even more firmly, fixes the padding material 34 on jaw 12, and eliminates any possibility of the padding material rolling or shifting its position on the jaw.

Of course, the padding material could be elastic to the extent that it can be firmly positioned merely by sliding over an existing jaw, as shown in FIG. 1. However, the various embodiments and mounting devices disclosed hereinbefore are preferred retention devices which precisely position the padding material with respect to the jaw, such that maximum benefit is achieved during actuation of the trap. Additionally, although a concavely-curved face portion is shown throughout the drawings, and is the preferred embodiment of the shape of the padding means 34, for the reasons outlined in the aforementioned co-pending application, the use of a shock absorber means in an animal trap padding means is generally applicable, as are the various disclosed methods of retaining a padding material on a jaw.

Thus, although the invention has been described relative to specific embodiments thereof, it is not so limited, and many modifications and variations thereof will be readily apparent to those skilled in the art in the light of the above teachings. For example, the shock absorber padding means could be applied to folding frame animal traps, as well as the illustrated leg-hold type traps. In view of the teaching in the application, a number of methods of removably positioning padding on the jaws of an animal trap will be obvious to those of ordinary skill in the art. It is, therefore, to be understood that, within the scope of the appended claims, the invention may be practiced otherwise than as specifically described.

The embodiments of the invention in which an exclusive property or priviledge is claimed are defined as follows:

1. In an animal trap including a pair of elongated jaw means for releasably holding an animal, the jaw means including jaw faces, an actuator means for urging the jaw means about a pivot axis from a set position to a sprung position wherein the jaw faces are juxtaposed, latch means for releasably retaining the jaw means in the set position, and trigger means for releasing the latch means, the jaw faces including padding means carried by each jaw means, the padding means including resiliently padded face portions juxtaposed in the sprung position of the trap, said padding means having a compressive resistance in a direction from said face portion to said jaw face, each of the face portions of the padding means extending beyond its respective jaw face of the jaw means towards the other jaw face in the sprung position, the improvement comprising:

absorber means defining an intermediate portion of said padding means interposed between said face portion and said jaw face of each jaw means, said absorber means having a lower compressive resistance than said padding means.

2. An animal trap in accordance with claim 1, wherein said absorber means comprises at least one chamber internal to said padding means and extending along each of the elongated jaw means, said chamber filled with a low compression resistance material.

3. An animal trap in accordance with claim 2, wherein said low compression resistance material is a gas sealed in said chambers.

4. An animal trap in accordance with claim 2, wherein said low compression resistance material is a liquid sealed in said chambers, said chambers having resilient walls such that when said trap is in said sprung position around an animal extremity, a portion of said chamber adjacent said extremity is collapsed, and said liquid is displaced away from the vicinity of said extremity, expanding an uncollapsed portion of said chamber.

5. An animal trap in accordance with claim 2, wherein said low compression resistance material is a resilient foamed elastomer.

6. An animal trap in accordance with claim 1, wherein said face portions have inner longitudinal edge portions and outer longitudinal edge portions with respect to said pivot axis, and said trap includes means for raising a ridge of flesh in a portion of an animal trapped between said jaw means at least adjacent said inner longitudinal edge portion between said padding means and said pivot axis, said means for raising a ridge of flesh comprising raised portions adjacent said inner longitudinal edge portion of each padding means, and trough portions disposed between said raised portions and said outer longitudinal edge portions of each padding means, said raised portions extending beyond their respective trough portions towards said raised portions on said padding means of the opposite jaw in said sprung position.

7. An animal trap in accordance with claim 6, wherein said raised portions, in conjunction with said trough portions, defines a concave curvature in a transverse direction on said face portions of the padding means.

8. An animal trap in accordance with claim 1, wherein said face portions have inner longitudinal edge portions and outer longitudinal edge portions with respect to the pivot axis and said trap further includes means for providing said face portions of said padding means with a concave curvature between respective inner longitudinal edge portions and outer longitudinal edge portions, the concavity of the curvature, the resilience of the material of said padding means, and the strength of the actuator means being selected, such that upon springing the trap, said face portions maintain a non-convex orientation when holding said animal with said trap in said sprung position.

9. An animal trap in accordance with claim 1, said animal trap including mounting means for fixing said padding means to said jaw faces.

10. An animal trap in accordance with claim 9, wherein said mounting means comprises means defining an undercut channel at said jaw face; and
means defining a protrusion on said padding means for cooperatively engaging said undercut channel and retaining said padding means on said jaw.

11. An animal trap in accordance with claim 9, wherein said jaw means includes at least one jaw side adjacent to, and extending away from said jaw face, and said padding means includes a portion extending past said jaw face and parallel to said at least one jaw side, said trap further including retention means for compressing said portion of said padding means between said retention means and said jaw side, thus retaining said padding means on said jaw means.

12. An animal trap in accordance with claim 11, wherein said retention means is a metal strap stressed to compress said portion of said padding means between said strap and said jaw side and retaining said padding means on said jaw means.

13. An animal trap in accordance with claim 11, wherein said padding means includes a partially encompassing portion extending around said jaw means, said encompassing portion of said padding means located along said jaw side of said jaw means, said retention means compressing both said extending portion and said encompassing portion between said retention means and said jaw side.

14. An animal trap in accordance with claim 13, wherein said retention means is a metal strap formed to fit along said jaw side and said retention means further includes pressure means for placing said strap under stress forcing said encompassing portion and said extending portion to be compressed between said metal strap and said jaw side.

15. An animal trap in accordance with claim 14, wherein said metal strap includes at least two longitudinally extending metal high points and said pressure means forces said high points such that one extends into said encompassing portion and the other extends into said extending portion.

16. An animal trap in accordance with claim 1, wherein said jaw means comprises:
U-shaped jaw members, each with jaw sides formed by portions of said U-shaped jaw member extending away from said jaw face with the jaw means in the sprung position, said jaw sides encompassing an open portion of said U-shaped jaw member; and
said padding means having extending portions extending past said jaw face, along said jaw side, and into the open portion of said U-shaped jaw member; and
means for locking said extended portions of said padding means into said open portion of said U-shaped jaw member.

17. An animal trap in accordance with claim 16, wherein said means for locking comprises a locking channel, a portion of which is inserted between said extended portions of said padding means, frictionally locking said extended portions into place in the open portion of said U-shaped jaw member, said locking channel further including a portion extending external to, and adjacent, at least one of said extended portions between said open portion of said U-shaped jaw member and said jaw face.

18. An animal trap in accordance with claim 1, wherein said padding means encompasses said jaw means thereby retaining said padding means on said jaw means.

19. In an animal trap including a pair of elongated jaw means for releasably holding an animal, the jaw means including jaw faces, an actuator means for urging the jaw means about a pivot axis from a set position to a sprung position wherein the jaw faces are juxtaposed, latch means for releasably retaining the jaw means in the set position, and trigger means for releasing the latch means, the jaw faces including padding means carried by each jaw means, the padding means including resiliently padded face portions juxtaposed in the sprung position of the trap, each of the face portions of the padding means extending beyond its respective jaw face of the jaw means towards the other jaw face in the sprung position, said animal trap including mounting means for fixing said padding means to said jaw faces, said mounting means comprising:
means defining an undercut channel at said jaw face; and
means defining a protrusion on said padding means for cooperatively engaging said undercut channel and retaining said padding means on said jaw.

20. In an animal trap including a pair of elongated jaw means for releasably holding an animal, the jaw means including jaw faces, an actuator means for urging the jaw means about a pivot axis from a set position to a sprung position wherein the jaw faces are juxtaposed, latch means for releasably retaining the jaw means in the set position, and trigger means for releasing the latch means, the jaw faces including padding means carried by each jaw means, the padding means including resiliently padded face portions juxtaposed in the sprung position of the trap, each of the face portions of the padding means extending beyond its respective jaw face of the jaw means towards the other jaw face in the sprung position, the improvement comprising mounting means wherein said jaw means includes at least one jaw side adjacent to, and extending away from, said jaw face, and said padding means includes a portion extending past said jaw face and parallel to said at least one jaw side, said trap further including retention means for compressing said portion of said padding means between said retention means and said jaw side, thus retaining said padding means on said jaw means, wherein said padding means includes a partially encompassing portion extending around said jaw means, said encompassing portion of said padding means having a longitudinal edge located along said jaw side of said jaw means adjacent a longitudinal edge of said extending portion of said padding means, said retention means compressing said extending portion and said encompassing portion between said retention means and said jaw side.

21. An animal trap in accordance with claim 20, wherein said retention means is a metal strap stressed to compress said portions of said padding means between said strap and said jaw side, retaining said padding means on said jaw means.

22. An animal trap in accordance with claim 20, wherein said retention means is a metal strap formed to fit along said jaw side and said retention means further includes pressure means for placing said strap under stress forcing said encompassing portion and said extending portion to be compressed between said metal strap and said jaw side.

23. An animal trap in accordance with claim 22, wherein said metal strap includes metal projecting means such that said pressure means forces said projecting means into at least one of said encompassing and said extending portion.

24. In an animal trap including a pair of elongated jaw means for releasably holding an animal, the jaw means including jaw faces, an actuator means for urging the jaw means about a pivot axis from a set position to a sprung position wherein the jaw faces are juxtaposed, latch means for releasably retaining the jaw means in the set position, and trigger means for releasing the latch means, the jaw faces including padding means carried by each jaw means, the padding means including resiliently padded face portions juxtaposed in the sprung position of the trap, each of the face portions of the padding means extending beyond its respective jaw face of the jaw means towards the other jaw face in the sprung position, the improvement comprising:

said jaw means comprises U-shaped jaw members, each with jaw sides formed by portions by said U-shaped jaw member extending away from said jaw face with the jaw means in the sprung position, said jaw sides encompassing an open portion of said U-shaped jaw member; and said padding means having extended portions extending past said jaw face, along said jaw side, and into the open portion of said U-shaped jaw member; and means for locking said extended portions of said padding means into said open portion of said U-shaped jaw member.

25. An animal trap in accordance with claim 24, wherein said means for locking comprises a locking channel, a portion of which is inserted between said extended portions of said padding means frictionally locking said extended portions into place in the open portion of said U-shaped jaw member, said locking channel further including a portion extending external to and adjacent at least one of said extended portions of said padding means between said open portion of said U-shaped jaw member and said jaw face.

26. An animal trap in accordance with claim 22, wherein said strap has first portion formed to fit along said jaw side and a second portion substantially perpendicular to said first portion to fit over said encompassing portion of said padding means along a surface of said jaw opposite said jaw face.

27. An animal trap in accordance with claim 22, wherein said strap is pivoted to said jaw at one end of said strap and said pressure means includes screw means operating between said jaw and said strap at the other end of said strap.

* * * * *